US011589512B2

(12) United States Patent
Farley et al.

(10) Patent No.: US 11,589,512 B2
(45) Date of Patent: Feb. 28, 2023

(54) DRAPER SUPPORT FOR A DRAPER BELT ASSEMBLY OF AN AGRICULTURAL HARVESTER

(71) Applicant: CNH Industrial America LLC, New Holland, PA (US)

(72) Inventors: Herbert M. Farley, Elizabethtown, PA (US); Benjamin Kemmerer, Hamburg, PA (US); Blaine R. Noll, Fleetwood, PA (US); Brian L. Scheuring, Sinking Spring, PA (US)

(73) Assignee: CNH Industrial America LLC, New Holland, PA (US)

( * ) Notice: Subject to any disclaimer, the term of this patent is extended or adjusted under 35 U.S.C. 154(b) by 272 days.

(21) Appl. No.: 16/634,359

(22) PCT Filed: Jul. 24, 2018

(86) PCT No.: PCT/US2018/043498
§ 371 (c)(1),
(2) Date: Jan. 27, 2020

(87) PCT Pub. No.: WO2019/023238
PCT Pub. Date: Jan. 31, 2019

(65) Prior Publication Data
US 2021/0144922 A1    May 20, 2021

Related U.S. Application Data

(60) Provisional application No. 62/536,593, filed on Jul. 25, 2017.

(51) Int. Cl.
*A01D 61/00* (2006.01)
*A01D 41/14* (2006.01)
(Continued)

(52) U.S. Cl.
CPC ........... *A01D 61/002* (2013.01); *A01D 41/14* (2013.01); *A01D 57/20* (2013.01); *A01D 67/00* (2013.01)

(58) Field of Classification Search
CPC ...... A01D 61/002; A01D 41/14; A01D 57/20; A01D 67/00
See application file for complete search history.

(56) References Cited

U.S. PATENT DOCUMENTS

| 1,680,889 A | 8/1928 | Kluck |
| 1,862,101 A | 6/1932 | Pax |

(Continued)

FOREIGN PATENT DOCUMENTS

| EP | 2420129 B1 * | 1/2016 | ........... A01D 61/002 |
| WO | 2012/166738 A1 | 12/2012 | |

OTHER PUBLICATIONS

International Search Report and Written Opinion for Application No. PCT/US2018/043498 dated Sep. 28, 2018 (13 pages).

*Primary Examiner* — Arpad F Kovacs
(74) *Attorney, Agent, or Firm* — Peter Zacharias; Patrick Sheldrake (57) ABSTRACT

A header (102) for an agricultural harvester (100) comprising a frame (104), a cutter bar (106), a draper belt and a cutter bar support sub-assembly connected to the frame is disclosed. The cutter bar support sub-assembly generally includes a draper support sub-assembly (200A,200B) and a support arm subassembly. The draper support sub-assembly is pivotably connected to the support arm sub-assembly and pivotable about a longitudinal axis of the support arm sub-assembly. The draper support sub-assembly includes a first draper support (608) that includes a curved surface engaging the draper belt and a cutter bar mount (606)

(Continued)

supporting the cutter bar. The support arm sub assembly includes a support member connected to the frame.

20 Claims, 7 Drawing Sheets

(51) Int. Cl.
*A01D 57/20* (2006.01)
*A01D 67/00* (2006.01)

(56) References Cited

U.S. PATENT DOCUMENTS

| | | | | |
|---|---|---|---|---|
| 7,472,533 B2* | 1/2009 | Talbot | ............ | A01D 57/20 56/181 |
| 7,478,521 B2* | 1/2009 | Goers | ............ | A01D 61/002 56/208 |
| 7,549,280 B2* | 6/2009 | Lovett | ............ | A01D 57/20 56/208 |
| 7,600,364 B2* | 10/2009 | Lovett | ............ | A01D 57/20 56/181 |
| 7,640,720 B1* | 1/2010 | Lovett | ............ | A01D 57/20 56/181 |
| 7,788,891 B2 | 9/2010 | Puryk et al. | | |
| 7,971,418 B2 | 7/2011 | Conrad et al. | | |
| 7,975,462 B1* | 7/2011 | Figgins | ............ | A01D 41/14 56/181 |
| 8,322,520 B2* | 12/2012 | Dow | ............ | A01D 61/002 198/837 |
| 8,511,050 B1* | 8/2013 | Cormier | ............ | A01D 57/20 56/181 |
| 8,555,607 B2* | 10/2013 | Goers | ............ | A01D 41/14 56/181 |
| 8,601,779 B1* | 12/2013 | Figgins | ............ | A01D 34/283 56/181 |
| 8,621,837 B2 | 1/2014 | Sauerwein et al. | | |
| 9,161,492 B2 | 10/2015 | Fuechtling | | |
| 2009/0007533 A1* | 1/2009 | Lovett | ............ | A01D 61/002 56/14.5 |
| 2009/0266044 A1* | 10/2009 | Goers | ............ | A01D 57/20 56/208 |
| 2010/0269472 A1 | 10/2010 | Coers et al. | | |
| 2014/0196427 A1* | 7/2014 | Fuechtling | ............ | A01D 61/002 56/181 |
| 2019/0373815 A1* | 12/2019 | Modak | ............ | A01D 34/40 |

* cited by examiner

DRAPER SUPPORT FOR A DRAPER BELT ASSEMBLY OF AN AGRICULTURAL HARVESTER

FIELD OF THE INVENTION

The following exemplary embodiments of the present invention relate generally to a header of a plant cutting machine (e.g., a combine harvester) and, more specifically, to a header having a draper belt assembly configured to pivot in unison with a cutter bar.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure or a row unit with gathering chains and deck plates.

After crops are cut they are collected inside the header and transported via a draper belt towards a feederhouse located centrally of the header. To help facilitate cutting crops, headers are often designed to allow the cutter bar to pivotally flex or pivot to accommodate changes in terrain so that the cutter bar can better track the surface. However, to ensure that the cutter bar has sufficient room to flex the draper belt must be spaced substantially away from the cutter bar. Consequently, if the cut crop is too short, the crop bunches up on top of the cutter bar rather than falling onto the draper belt where it can be collected. This results in loss of crop and decreased efficiency.

Thus, there is still a need for a header that is capable of accommodating for changes in terrain while still maintaining efficient crop gathering.

BRIEF SUMMARY OF THE INVENTION

In accordance with an exemplary embodiment, the subject disclosure provides a draper support sub-assembly for a draper belt assembly of a header of an agricultural harvester comprising a first draper support, a second draper support and a cutter bar mount. The first draper support includes a curved surface for supporting a draper belt. The second draper support incudes a curved surface for supporting the draper belt. The cutter bar mount is for supporting a cutter bar and is positioned adjacent to the first and second draper supports.

An aspect of the exemplary embodiment is that the second draper support is spaced from and below the first draper support. The first draper support is an elliptical shaped support member. The cutter bar mount includes a cutter arm extending outwardly away from the first draper support for connecting to the cutter bar. The cutter bar mount includes a draper arm extending below the first draper support for supporting the second draper support.

In accordance with another exemplary embodiment, the subject disclosure provides a cutter bar support sub-assembly for a draper belt assembly of a header of an agricultural harvester comprising a draper support sub assembly and a support arm sub-assembly. The draper support sub-assembly includes a first draper support and a cutter bar mount. The first draper support includes a curved surface for supporting a draper belt. The cutter bar mount is for supporting a cutter bar and is connected to the first draper support. The support arm sub-assembly includes a support member for connecting to the header. The draper support sub-assembly is pivotably connected to the support arm sub-assembly and pivotable about a longitudinal axis of the support arm sub-assembly.

An aspect of the exemplary embodiment is that the draper support sub assembly includes a second draper support having a curved surface for supporting the draper belt. The second draper support is connected to the cutter bar mount. The draper support sub-assembly includes a second draper support having a curved surface for supporting the draper belt. The second draper support is spaced from and below the first draper support. The cutter bar mount includes a draper arm extending below the first draper support for supporting a second draper support having a curved surface for supporting the draper belt. The cutter bar mount includes a cutter arm extending outwardly away from the first draper support for connecting to the cutter bar. The support arm sub-assembly is pivotable about an axis substantially perpendicular to the longitudinal axis of the support arm sub-assembly in a direction upwards or downwards relative to the frame.

In accordance with yet another exemplary embodiment, the subject disclosure provides a header for an agricultural harvester comprising a frame, a cutter bar, a draper belt and a cutter bar support sub-assembly connected to the frame. The cutter bar support sub-assembly includes a draper support sub-assembly and a support arm sub-assembly. The draper support sub-assembly includes a first draper support and a cutter bar mount. The first draper support includes a curved surface engaging the draper belt. The cutter bar mount supports the cutter bar. The support arm sub-assembly includes a support member connected to the frame. The draper support sub-assembly is pivotably connected to the support arm sub-assembly and pivotable about a longitudinal axis of the support arm sub-assembly.

An aspect of the exemplary embodiment is that the cutter bar support sub-assembly is positioned above the draper belt. The support member extends across a width of the draper belt and the draper belt circumscribes the support member. The draper support sub-assembly further includes a second draper support having a curved surface engaging the draper belt and spaced from and below the first draper support. The draper support sub-assembly further includes a second draper support having a curved surface engaging the draper belt. The first draper support supports an upper portion of the draper belt and the second draper support supports a bottom portion of the draper belt.

Another aspect of the exemplary embodiment is that the draper support sub-assembly further includes a second draper support having a curved surface engaging the draper belt. A bottom portion of the draper belt extends between the first draper support and the second draper support. The cutter bar mount includes a draper arm extending outwardly and below a bottom portion of the draper belt for supporting a second draper support. The support arm sub-assembly is pivotally connected to the frame and configured to pivot about an axis substantially perpendicular to the longitudinal axis of the support arm sub-assembly. The draper support sub-assembly further includes a second draper support having a curved surface engaging the draper belt and the cutter bar mount is connected to both the first and second draper supports.

BRIEF DESCRIPTION OF THE SEVERAL VIEWS OF THE DRAWINGS

The foregoing summary, as well as the following detailed description of the exemplary embodiments, will be better understood when read in conjunction with the appended drawings. For illustration purposes, there are shown in the drawings exemplary embodiments. It should be understood, however, that the subject disclosure is not limited to the precise arrangements and instrumentalities shown.

DETAILED DESCRIPTION OF THE INVENTION

Reference will now be made in detail to the various exemplary embodiments illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below, front, real, and diagonal, are used with respect to the accompanying drawings. The terms "right," "left," "front," and "rear" are used to describe positions relative to an operator. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. Exemplary embodiments of the header described herein is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the exemplary embodiments can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments.

Referring now to the drawings, there is illustrated an agricultural harvester 100 in accordance with an exemplary embodiment of the subject disclosure. For exemplary purposes only, the agricultural harvester is illustrated as a combine harvester. The harvester 100 includes a header 102 comprising a frame 104, a cutter bar 106 and a draper belt assembly. In an exemplary embodiment, the draper belt assembly comprises a right draper belt sub-assembly 200A and a left draper belt sub-assembly 200B.

Figure 1A:
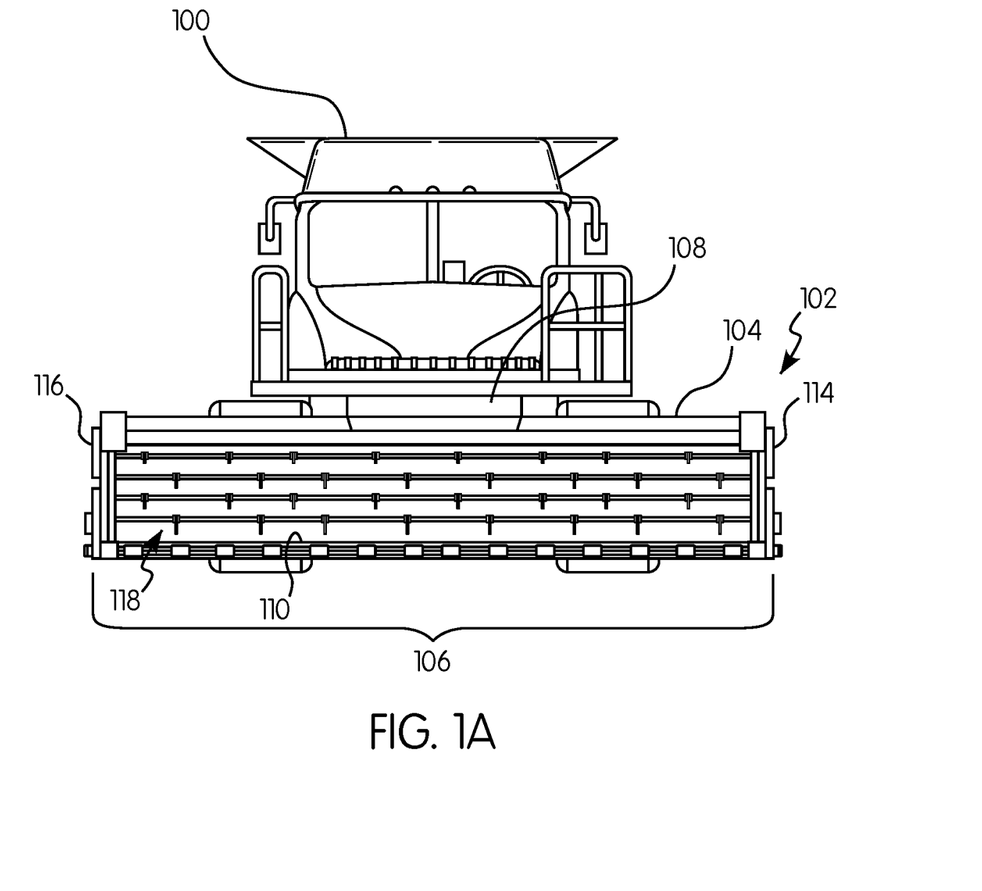
FIG. 1A is a front elevation view of an agricultural harvester including a header in accordance with an exemplary embodiment.
Figure 1B:
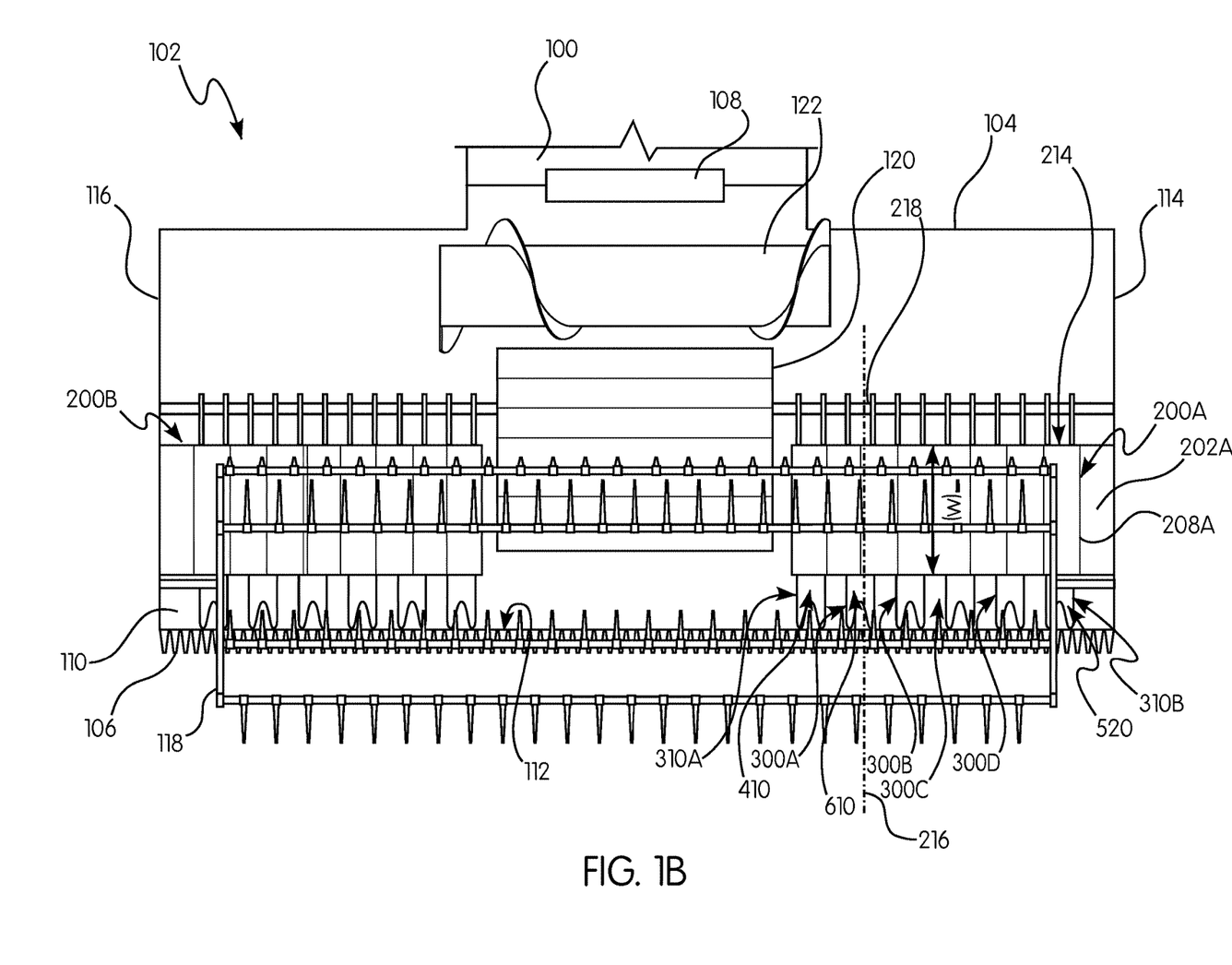
FIG. 1B is a top schematic view of the header of FIG. 1A.

Referring now to FIGS. 1A and 1B, the frame 104 is the structural chassis of the header 102 and allows for the various components of the header 102 to be attached thereto. The header 102 is attached to a forward end of the harvester 100, and is configured to cut crops, including (without limitation) small grains (e.g., wheat, soybeans, grain, etc.), and to induct the cut crops into a feederhouse 108 as the harvester 100 moves forward over a crop field.

The header 102 includes a floor 110 that is supported in desired proximity to the ground surface. The cutter bar 106 of the header 102 extends transversely along a forward edge 112 of the floor i.e., in a widthwise direction of the harvester 100, and is bound by a first side edge 114 and an opposing second side edge 116, which are both adjacent to the floor 110. The cutter bar 106 is configured to cut crops in preparation for induction into the feederhouse 108. It is appreciated that the cutter bar 106 includes one or more reciprocating sickles such as those disclosed in U.S. Pat. No. 8,151,547, the entire disclosure of which is incorporated herein by reference for all purposes. It is appreciated that the cutter bar 106 is configured to be flexible to accommodate changes in terrain as the harvester 100 moves forward over the crop field.

The header 102 may further include an elongated, rotatable reel 118 which extends above and in close proximity to the cutter bar 106. The reel 118 is configured to cooperate with the draper belt assembly, specifically the draper belt sub-assemblies 200A, 200B, and an infeed draper belt 120 in conveying cut crops to the feederhouse 108. The draper belt sub-assemblies 200A, 200B and infeed draper belt 120 are configured to convey the cut crops into the harvester 100, and, more specifically, towards the feederhouse 108, for threshing and cleaning. Additionally, the header 102 may include a rotatable auger 122, e.g., a conveyor screw, to facilitate feeding into the feederhouse 108. While the foregoing aspects of the harvester 100 are being described with respect to the header shown, the draper belt sub-assembly 200A of the subject disclosure can be applied to any other header having use for such a draper belt sub-assembly.

Referring now to FIGS. 2-7, there is illustrated an exemplary embodiment of the right draper belt sub-assembly 200A in accordance with an exemplary embodiment of the subject disclosure which is configured substantially as shown. For the purposes of discussion herein, the right draper belt sub-assembly 200A is described. It is to be understood that the left draper belt sub-assembly 200B is a mirror image configuration of the right draper belt sub-assembly 200A with corresponding elements and features.

The draper belt sub-assembly 200A includes a draper belt 202A, a first (or outboard) roller 402 and a second roller 502, a motor 404, support plates 302A, a tensioning mechanism 500A, one or more cutter bar support sub-assemblies 300A, 300B, 300C, 300D, a first end cutter bar support sub-assembly 310A and a second end cutter bar support sub-assembly 310B. The cutter bar support sub-assemblies 300A, 300B, 300C, 300D, 310A, 310B are positioned above the draper belt 202A and are connected to the frame 104. Specifically, the cutter bar support sub-assemblies 300A, 300B, 300C, 300D, 310A, 310B are positioned above a portion of the draper belt 202A and are circumscribed by the draper belt 202A. For the purposes of discussion herein, the cutter bar support sub-assembly 300A is described. It is to be understood that the remaining cutter bar support sub-assemblies 300B, 300C, 300D, 310A, 310B are substantially identical to the cutter bar support sub-assembly 300A with corresponding elements and features, except where otherwise specified. It is also appreciated that the exemplary embodiments can be practiced with any number of cutter bar support assemblies, including one, two, three, four, five, six, seven, eight, nine, ten or more.

Figure 2:
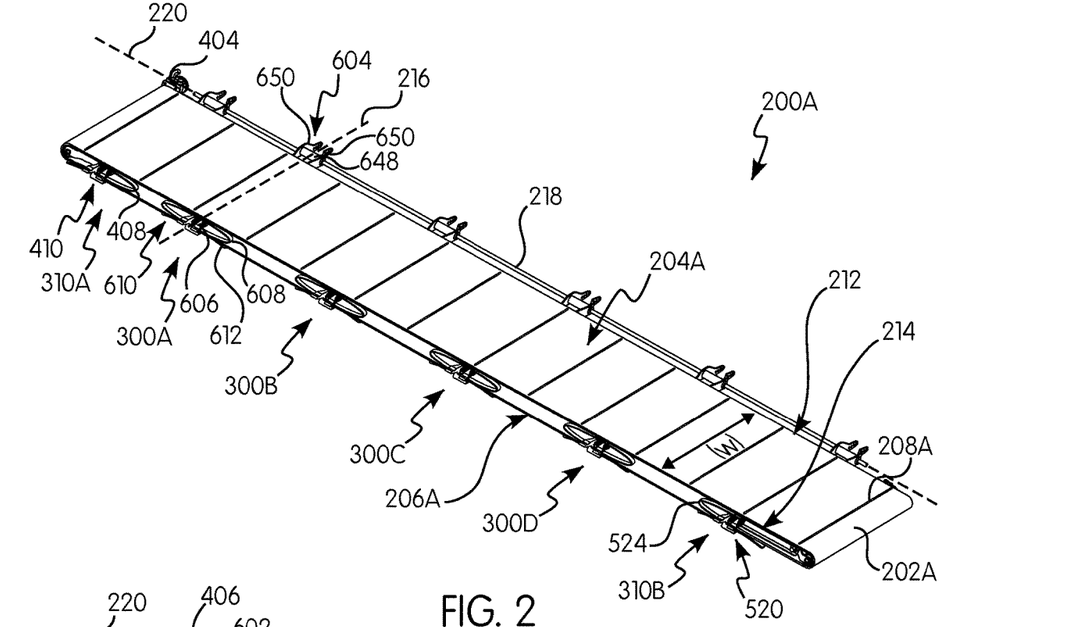
FIG. 2 is a perspective view of an exemplary embodiment of a draper belt sub-assembly applicable to the header in FIG. 1.
Figure 7:
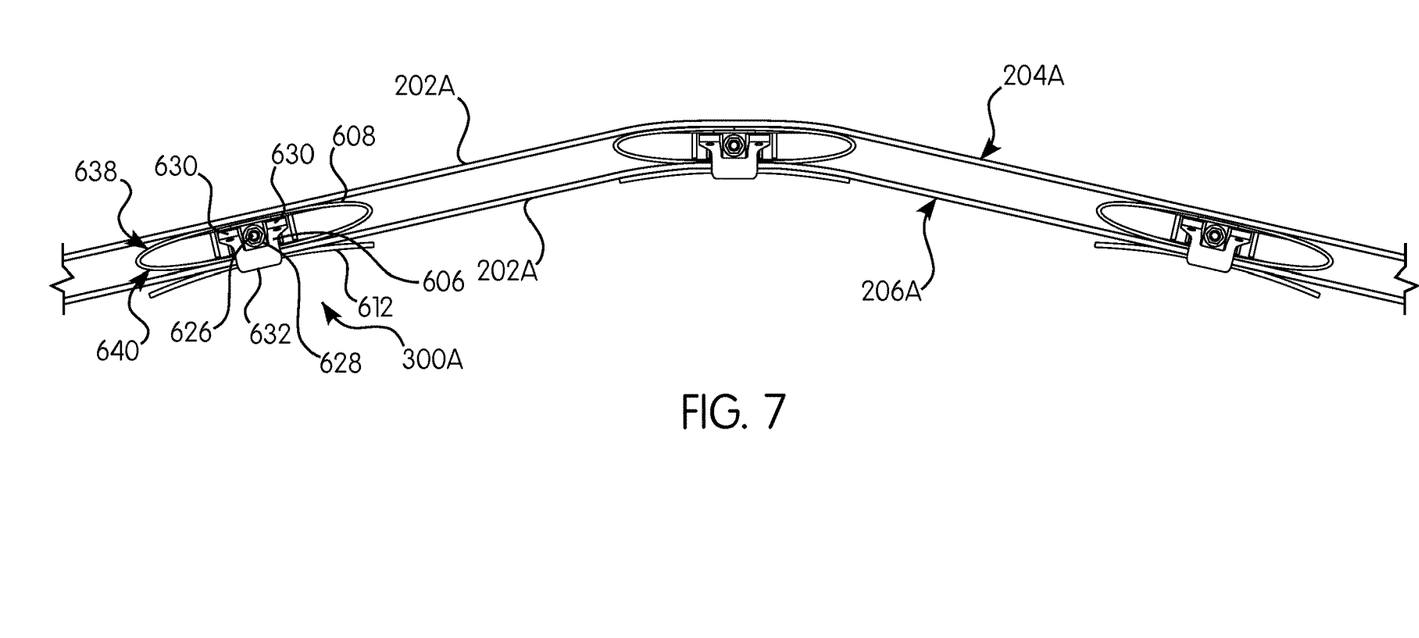
FIG. 7 is a partial front elevation view of a flexed draper belt sub-assembly in accordance with an exemplary aspect of the subject disclosure.

Referring to FIGS. 2 and 7, the draper belt 202A is configured substantially as shown. The draper belt 202A is a conveyor belt having an endless web extending around the first and second rollers 402, 502. When extended around the first and second rollers 402, 502, the draper belt forms an upper portion 204A and a bottom portion 206A. Additionally in an exemplary embodiment, the draper belt 202A includes a series of slats 208A extending widthwise (W) across the draper belt. The slats 208A extend marginally outward from an outer surface the draper belt 202A to facilitate gripping and transporting the cut crop to the feederhouse 108. It is appreciated that the slats 208A can be e.g., protrusions, indents, etc., and be vertical or diagonal slats. The draper belt 202A is configured to be rotatable via the first and/or second roller 402, 502 in a direction suitable for facilitating the induction of cut crops into the feederhouse. In other words, the draper belt 202A is configured to rotate towards a center of the header 102. Furthermore, the draper belt 202A can be made of a flexible material such that it can flex to accommodate flexing of the cutter bar 106. Appropriate flexible materials include e.g., rubber, plastic, chains, and so forth as is well known in the art.

Figure 3:
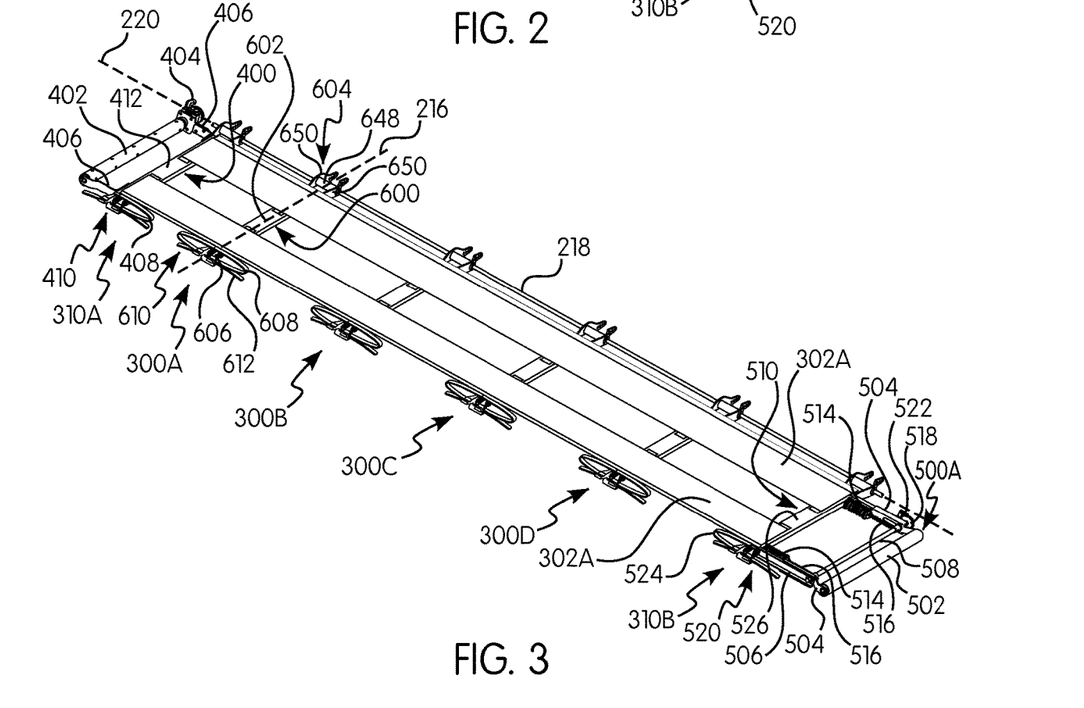
FIG. 3 is a perspective view of the draper belt sub-assembly of FIG. 2 without the draper belt.
Figure 4:
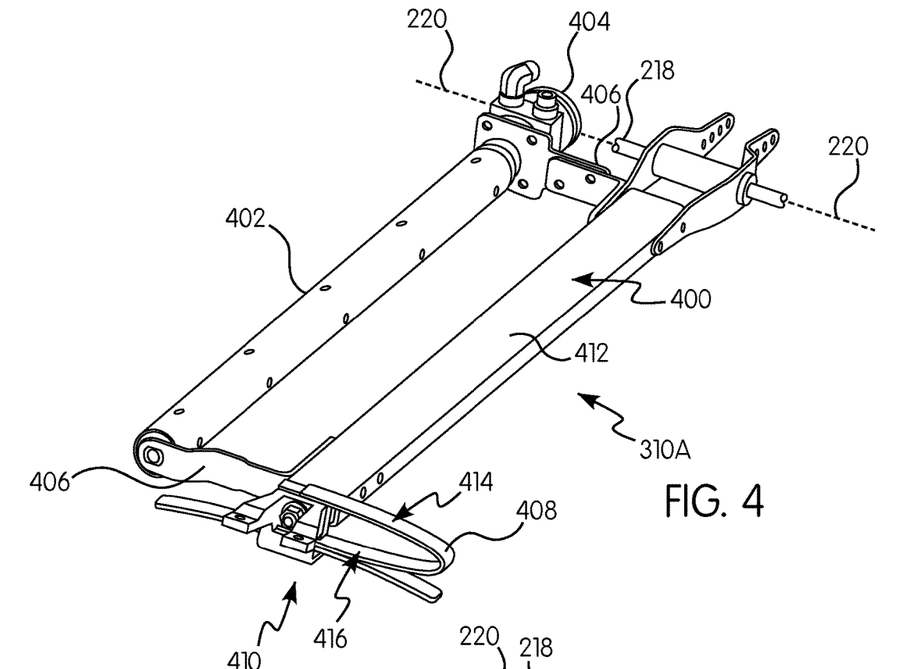
FIG. 4 is a perspective view of a first end cutter bar support sub-assembly and a first roller applicable to the draper belt sub-assembly of FIG. 2.
Figure 5:
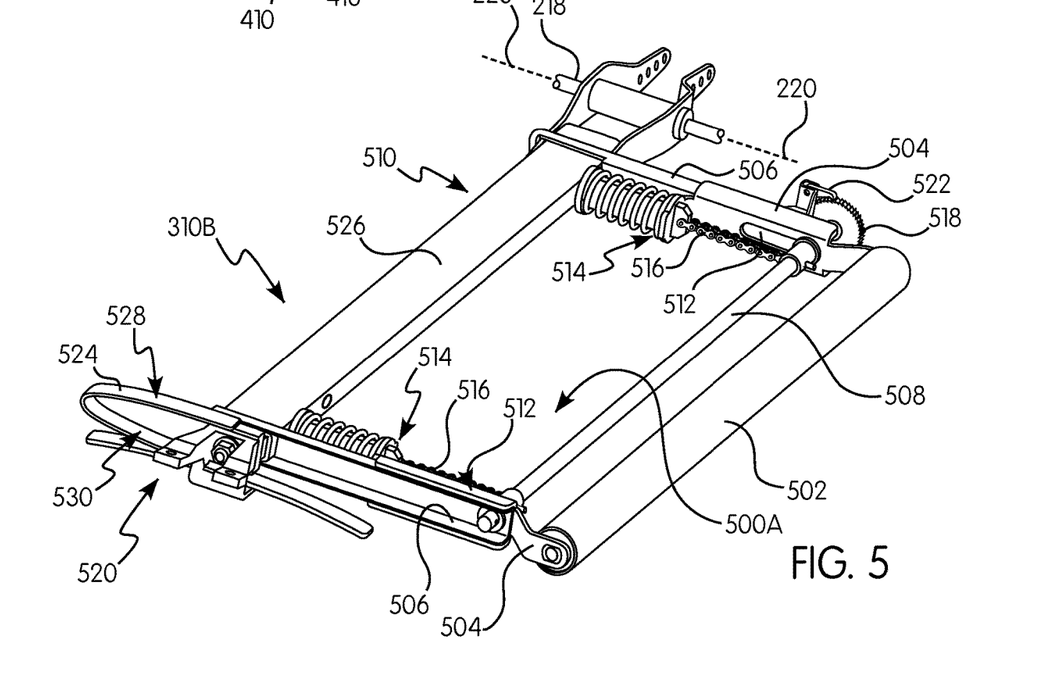
FIG. 5 is a perspective view of a second end cutter bar support sub-assembly and a second roller applicable to the draper belt sub-assembly of FIG. 2.

Referring now to FIGS. 3-5, the first roller 402, the second roller 502 and the motor 404 are configured substantially as shown. The first and second rollers 402, 502 are rotatable cylinders configured to engage the draper belt 202A and to transfer rotational motion from the motor 404 to the draper belt 202A. The first and second rollers 402, 502 include securing brackets 406, 504 configured to connect the rollers to the first and second end cutter bar support assemblies 310A, 310B, respectfully. Additionally, in the exemplary embodiment, the second roller's securing bracket 504 is configured to be movably connectable to the tensioning mechanism's 500 support connector 506 and guide bar 508 via an aperture or guide 512, sized to receive the guide bar 508.

In the exemplary embodiment one of the first or second rollers 402, 502 is a driven roller, preferably the first roller 402. The motor 404 is configured to provide rotational motion to the driven roller. In the exemplary embodiment, the motor 404 is a hydraulic motor. In other words, the draper belt sub-assembly 200A further includes a driven roller, i.e. the first roller 402, supported by the cutter bar support sub-assembly 310A.

Referring to FIG. 3, the support plates 302A are configured substantially as shown. The support plates 302A are elongated members having substantially planar upper surfaces configured to slidably engage a bottom surface of the upper portion 204A of the draper belt 202A. The support plates 302A are configured to extend lengthwise above the cutter bar support sub-assembly 300A to support the draper belt 202A. It is appreciated that the support plates 302A may be single uniform pieces or may be segmented between the cutter bar support sub-assemblies 300A, 300B, 300C, 300D, 310A, 310B. It is also appreciated that the support plates 302A may be omitted from the draper belt sub-assembly 200A without deviating from the subject disclosure.

Referring now to FIGS. 3 and 5, the tensioning mechanism 500A is configured substantially as shown. The tensioning mechanism 500A includes the support connector 506, the guide bar 508, a biasing member 514, a chain 516 and a cog 518. The support connector 506 is a member shaped to slidably connect with the securing bracket 504 and includes the guide 512 configured to receive the guide bar 508. The guide bar 508 is an elongated bar configured to be slidable within the guide 512. The biasing member 514 is configured to provide a biasing force against the second end cutter bar support sub-assembly 310B via, for example, a spring. The biasing member 514 is further configured to be compressible via the chain 516. The chain 516 is configured to wrap around the guide bar 508. The cog 518 is a rotatable member having teeth configured to engage a locking mechanism 522 such that, when rotated, the chain 516 wraps around the guide bar 508 to thereby increase or decrease the distance between the second end cutter bar support sub-assembly 310B and the second roller 502. The locking mechanism 522 is configured to lock the cog 518 from rotating when engaged.

Referring now to FIGS. 3-6B, the cutter bar support assemblies 300A, 310A, 310B are configured substantially as shown. The cutter bar support assemblies 300A, 310A, 310B are positioned above the draper belt 202A, and more specifically the bottom portion 206A. Each of the cutter bar support assemblies 300A, 310A, 310B comprise a support arm sub-assembly 600, 400, 510, respectively, and a draper support sub-assembly 610, 410, 520, respectively. For the purposes of discussion herein, the support arm sub-assembly 600 and the draper support sub-assembly 610 is described herein. It is understood that the remaining support arm sub-assemblies 400, 510 and draper support sub-assemblies 410, 520 are substantially identical to the support arm sub-assembly 500 and the draper support sub-assembly 610, respectively, with corresponding elements and features, except where otherwise specified.

The support arm sub-assembly 600 includes a support member 602 connectable to the header 102 for supporting the cutter bar 106 and a frame mounting sub-assembly 604. The draper support sub-assemblies 610 includes a cutter bar mount 606, a first draper support 608 and a second draper support 612. For the purposes of discussion herein, the first draper support 608 is described. It is to be understood that other first draper supports, e.g., first draper supports 408, 524 for the end draper support sub-assemblies 410, 520, respectively, are substantially identical to the first draper support 608 with corresponding elements and features, except where otherwise specified.

Figure 6A:
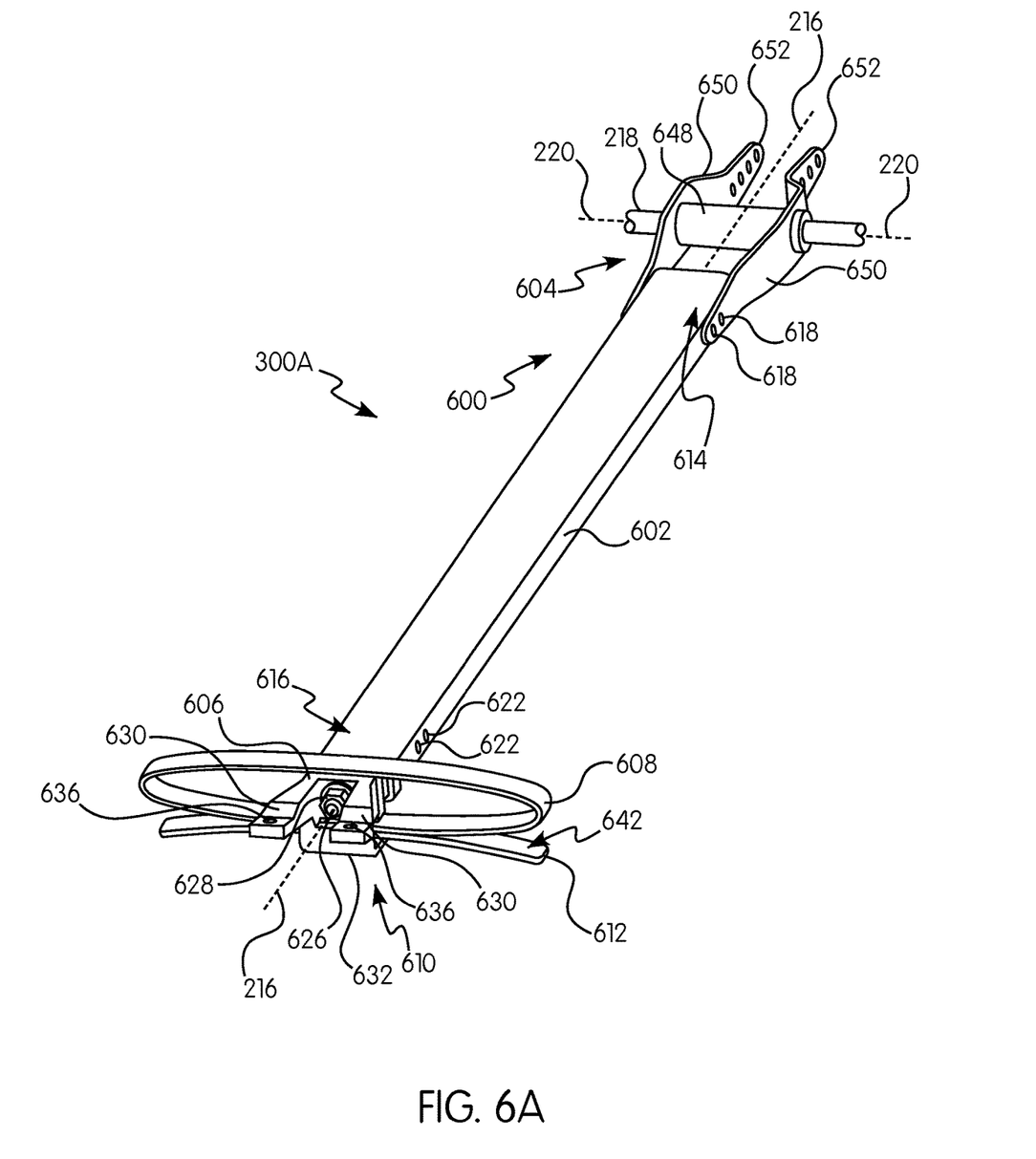
FIG. 6A is a perspective view of a cutter bar support sub-assembly applicable to the draper belt sub-assembly of FIG. 2.
Figure 6B:
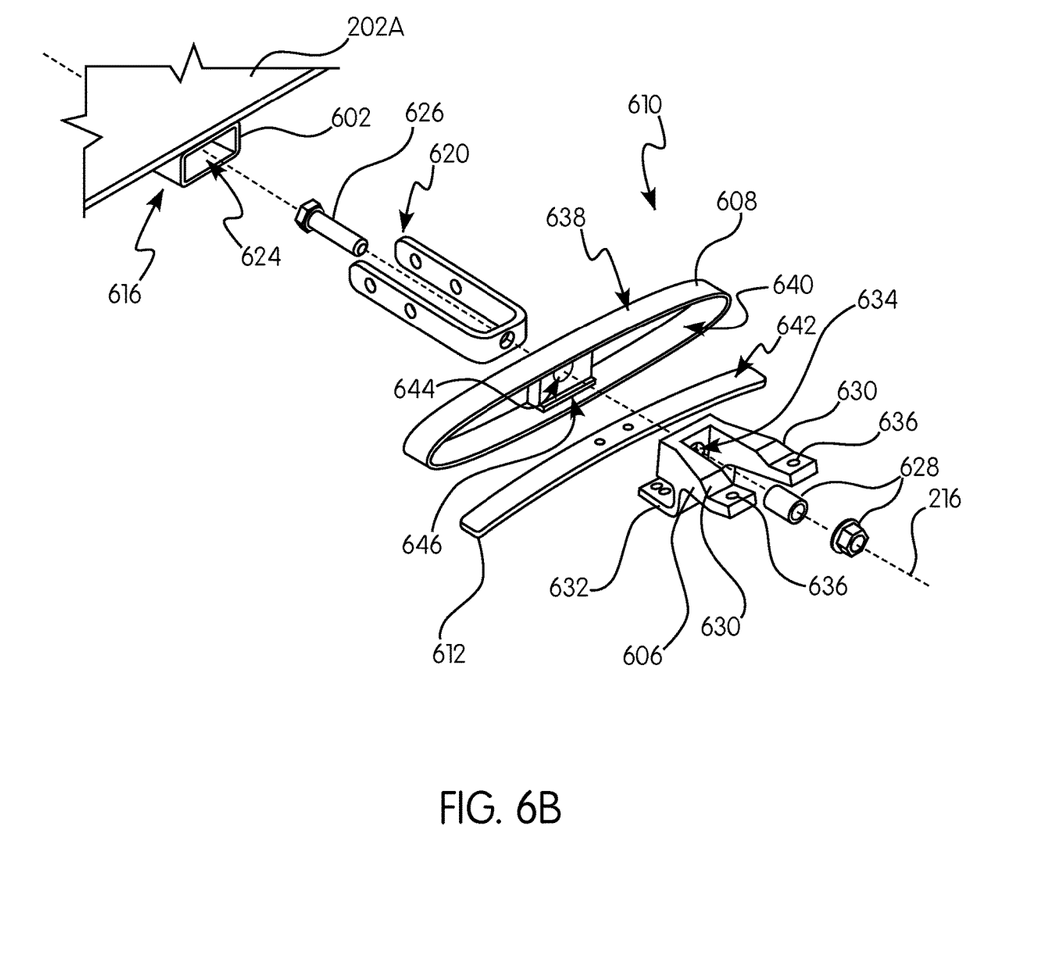
FIG. 6B is a perspective exploded view of a draper support sub-assembly in accordance with an exemplary aspect of the cutter bar support sub-assembly of FIG. 6A.

The support member 602 is configured substantially as shown. The support member 602 is an elongated member having a first end 614 and a second end 616. The first end 614 is configured to be at about an aft side 212 of the draper belt 202A and the second end 616 is configured to be at about a fore side 214 of the draper belt 202A. The first end 614 is configured to attach to the frame 104 via the frame mounting sub-assembly 604. In an exemplary embodiment, the first end 614 is configured to be connectable to the frame mounting sub-assembly 604 via, e.g., fasteners 618. Such fasteners 618 include, for example, apertures configured to receive pins, screws, and so forth as is well known in the art. The second end 616 includes a mounting portion 620. It is appreciated that the mounting portion 620 may be integrally formed with the support member 602 or may be connectable to the support member via, e.g., fasteners 622. Such fasteners 622 include, for example, apertures configured to receive pins, screws, and so forth as is well known in the art. In an exemplary embodiment, the support member 602 includes a cavity 624 at the second end 616 configured to receive the mounting portion 620.

Additionally, the support arm sub-assemblies' 400, 510 support members 412, 526 are similarly structured as the support member 602. The support member 412 is connectable to the securing brackets 406 and the support member 526 is connectable to the tensioning mechanism 500A as described above.

The mounting portion 620 includes a pin 626 extending from the second end 616 configured to be pivotably mounted by the cutter bar mount 606 and/or the first draper support 608. As shown in FIG. 7, the pin 626, when mounted by the cutter bar mount 606 and/or the first draper support 608 permits the cutter bar mount and the first draper support to pivot and accommodate the changing shape of the draper belt 202A as it is caused to flex up and/or down by the cutter bar 106. The pin 626 includes a fastener, e.g. a threaded connection, on a distal end configured to receive, e.g., a nut or stop 628 to secure mounted components to the mounting portion 620.

Referring now to FIG. 6B, the cutter bar mount 606 is configured substantially as shown. The cutter bar mount 606 includes one or more cutter arms 630, a draper arm 632 and a mounting mechanism 634. The cutter arms 630 extend forwardly towards the cutter bar 106 and include apertures 636 for receiving a fastener for rigidly securing to the cutter bar 106. For example, the apertures 636 are sized to receive fasteners such as screws. It is appreciated that other fastening mechanisms may be used in place of apertures 626 and screws as described herein, such as welding, which are well known in the art. In an exemplary embodiment, the cutter bar mount 606 includes two cutter arms 630. However, it is appreciated that any number of cutter arms 630 can be used including one, two, three, four or more than four.

The draper arm 632 extends downwardly and is shaped to curve around and under an edge of the draper belt 202A, i.e., the bottom portion 206A. The draper arm 632 is configured to receive and be connectable to the second draper support 612. It is appreciated that the draper arm 632 serves the additional function to prevent the draper belt 202A from sliding forward, i.e. towards the cutter bar 106, because it extends around an edge of the draper belt 202A. The mounting mechanism 634 is configured to pivotably secure to the mounting portion 620 of the support member 602. In the exemplary embodiment, the mounting mechanism 634 includes an aperture configured to receive the pin 626.

In other words, the cutter bar mount 606 includes a cutter arm 630 extending outwardly away from the draper belt 202A rigidly connected to the cutter bar 106. Put differently, the cutter bar mount 606 has a cutter arm 630 extending outwardly and away from the first draper support 608 for connecting to the cutter bar 106. Additionally, the cutter bar mount 606 also includes a draper arm 632 extending below the first draper support 608 for supporting the second draper support 612. Specifically, the draper arm 632 extends outwardly away from the draper belt 202A, around a fore 214 of the bottom portion 206A of the draper belt 202A, and under the bottom portion 206A of the draper belt 202A for supporting a second draper support 612. The draper belt support sub-assembly 200A includes a second draper support 608 having a curved surface engaging the draper belt 202A and the cutter bar mount 606 is connected to both the first and second draper supports 608, 612.

Referring now to FIGS. 4-6B, the first and second draper supports 608, 612 are configured substantially as shown. The draper supports 608, 612 are curved members configured to support the draper belt 202A from below the upper portion 204A and/or the bottom portion 206A. In an exemplary embodiment, the first draper support 608 has an upper portion 638 and a bottom portion 640 configured to engage the draper belt's 202A upper portion 204A and bottom portion 206A, respectively. Similarly, the first draper supports 408, 524 of the first and second end cutter bar support assemblies 310A, 310B also have an upper portion 414, 528 and a bottom portion 416, 530 but are sized and shaped to accommodate the draper belt 202A extending around the first and second rollers 402, 502, respectively. The second draper support 612 has an upper portion 642 configured to engage the draper belt's 202 bottom portion 206A. In another exemplary embodiment, the draper supports 608, 612 consist essentially of only the upper portions 638, 642.

The first draper support 608 includes a mount 644 similar to the mounting mechanism 634 configured to pivotably secure to the mounting portion 620 of the support member 602. In the exemplary embodiment, the mount 644 includes an aperture configured to receive the pin 626. Additionally, the second draper support 612 is configured to secure to the cutter bar mount 606 via welding or fastening to the draper arm 632 or being integrally formed therewith.

In other words, the cutter bar support sub-assembly further includes a second draper support rigidly connected to the cutter bar mount, wherein the second draper support supports the draper belt from below the bottom portion of the draper belt. Put differently, the draper support sub-assembly includes a second draper support having a curved surface for supporting the draper belt, and wherein the second draper support is connected to the cutter bar mount.

In an exemplary embodiment, the first draper support 608 is elliptical shaped and has a major axis of about e.g., 20" to 30" long or about 25" long and a minor axis having a length substantially equal to the diameter of the first and second rollers 402, 502. In an exemplary embodiment, the second draper support 612 has an equal major axis length as the first draper support 608. However, it is appreciated that the axes of the first and second draper supports can vary between each cutter bar support sub-assembly 300A, 300B, 300C, 300D, 310A, 310B and range anywhere from about 5 inches to 60 inches. Additionally, it is also appreciated that the draper supports 608, 612 do not need to be single elliptical members and can instead each be made of multiple members forming a curved path for the draper belt 202A to extend across. It is also appreciated that the draper supports may take different shapes such as shown by the draper supports 408, 524 of the first and second end cutter bar support assemblies 310A, 310B.

In other words, the first draper support is an elliptical shaped support member, the second draper support is a curved support member, and the first and second draper supports are each a curved support member. The first draper support supports an upper portion of the draper belt and the second draper support supports a bottom portion of the draper belt. Additionally, the bottom portion of the draper belt extends between the first draper support and the second draper support. Furthermore, the first and second draper supports have a major axis extending substantially parallel to a longitudinal length of the draper belt. Furthermore, the support member has a second end at about a second lateral side of the draper belt having a mounting portion adjacent to the second lateral side. The first draper support is pivotably connected to the mounting portion and supports the draper belt from below the upper portion. The first draper support is pivotable about an axis, e.g., a longitudinal axis 216, parallel to a longitudinal length of the support member, e.g., about the pin. The draper support sub-assembly is pivotably connected to the support arm sub-assembly and pivotable about a longitudinal axis of the support arm sub-assembly. Additionally, the cutter bar support sub-assembly further includes a cutter bar mount pivotably connected to the mounting portion for supporting the cutter bar. The cutter bar mount is pivotable about an axis, e.g., a longitudinal axis, parallel to a longitudinal length of the support member, e.g., about the pin.

Additionally, the cutter bar mount 606 and the first draper support 608 also include a connecting mechanism 646 configured to secure the cutter bar mount to the first draper support. In an exemplary embodiment, the connecting mechanism 646 includes a flange extends from the first draper support 608 and over the cutter bar mount 606 such that the first draper support 608 and the cutter bar mount 606 are interlocked and rotate together about the longitudinal axis 216. In other words, when either the cutter bar mount 606 or the draper support 608 pivot about the pin 626, the other of the cutter bar mount 606 or draper support 608 is forced to pivot in the same direction. In another exemplary embodiment, the first draper support 608 and the cutter bar mount 606 are integrally formed together, or alternatively, the cutter bar mount 606 is rigidly connected to the first draper support 608 by way of fasteners.

Referring to FIGS. 4-6A, the frame mounting sub-assembly 604 is configured substantially as shown. The frame mounting sub-assembly 604 includes a pivot guide 648 and an elongated member 650. The pivot guide 648 is a hollowed cylindrical member configured to receive an elongated bar 218 that is secured to the frame 104 of the header 102. Thus, as shown in FIGS. 2 and 7, the pivot guide 648 permits the support member 602 to pivot in an upward and/or downward direction, relative to the header 102 around the elongated bar 218 and e.g., an axis 220. It is appreciated that the pivot guide 648 may instead be integrally formed with the elongated bar 218 and the elongated bars 650 be free to rotate about the pivot guide 648. In other words, the support arm sub-assembly 600 is pivotable about an axis 220 substantially perpendicular to the longitudinal axis 216 of the support arm sub-assembly 600 in a direction upwards or downwards relative to the frame 104.

The elongated member 650 includes fastener 652, such as a series of apertures 652 configured to receive screws, along a length of the elongated member 650. On one end, the elongated member 650 is configured to secure to an actuator (not shown). On the other end, the elongated member 650 is configured to secure to the support member 602 by e.g., fasteners 618. The actuator (not shown) is configured to provide an upward lifting force to lift the support member 602 and to provide a counterbalancing force for the weight of the cutter bar 106 when the cutter bar 106 is attached to the second end 616 of the support member 602. In the exemplary embodiment, the actuator is a hydraulic cylinder. However, actuators suitable to the exemplary embodiment care disclosed in U.S. Pat. No. 8,554,425, the entire disclosure of which is incorporated by reference herein for all purposes. Additionally, the elongated member 650 includes an aperture sized to receive the pivot guide 648 and configured to permit pivoting motion relative to the pivot guide 648. It is appreciated that the elongated member 650 may be integrally formed with the support member 602 and/or pivot guide 648 or otherwise attached in ways known in the art, e.g., welding.

In an exemplary embodiment, each frame mounting sub-assembly 604 includes two elongated members 650. However, it is appreciated that the subject disclosure can be practiced with one, three, four, five or more elongate members.

In other words, the support member 602 has a first end 614 about an aft side 212 of the draper belt 202A pivotably connected to the header 102. The support member 602 is configured to pivot about an axis 220 substantially perpendicular to a longitudinal length of the support member 602 in a direction upwards or downwards relative to the frame 104.

Referring now to FIGS. 1A, 1B and 2, the header 102 is operatively connected to the harvester 100. The elongated member 650 of the frame mounting sub-assembly 604 is operatively connected to an actuator (not shown) and rigidly connected to the support member 602. Additionally, the frame mounting sub-assembly 604 is pivotably connected to the frame 104 of the header 102 via the elongated bar 218 connected to the frame 104 and extending through the pivot guide 648. In other words, the cutter bar support sub-assembly is pivotably connected to the header.

The support plates 302A are secured to the top of the support member 602 along a widthwise direction of the header. The mounting portion 620 is secured to the second end 616 of the support member 602. The first draper support 608 and the cutter bar mount 606 are pivotally attached to the pin 626 of the mounting portion 620 and connected to each other via the connecting mechanism 646 such that first draper support 608 and the cutter bar mount 606 pivot in unison. The first draper support 608 and the cutter bar mount 606 are held on the pin 626 via, e.g., the nut 628 secured to the end of the pin 626.

The second draper support 612 and the cutter bar 106 are rigidly connected to the draper arm 632 and cutter arm 630, respectively. The first roller 402 is attached to the first end cutter bar support sub-assembly 310B via the securing brackets 406. The motor 404 is operatively connected to the first roller 402, i.e., the driven roller, to provide rotational motion to the draper belt 202A of the draper belt sub-assembly 200A. The second roller 502 is movably attached to the second end cutter bar support sub-assembly 310B via the tensioning mechanism 500A. Additionally, the tensioning mechanism's 500A biasing members 514 are attached to the second end cutter bar support sub-assembly 310B to provide tensioning to the draper belt 202A. In other words, the cutter bar support sub-assembly further includes a cutter bar mount pivotably connected to the support member for supporting the cutter bar.

The draper belt 202A circumscribes the first and second rollers 402, 502, the support members 602, the support plates 302A and the first draper supports 608 of the cutter bar support assembly 300A. In other words, the cutter bar support assemblies 300A, 300B, 300C, 300D, 310A, 310B and the first draper supports 608, 408, 524 are located between the upper portion 204A and the bottom portion 206A of the draper belt 202A. More specifically, the bottom portion 206A of the draper belt 202A extends between the bottom portion 640 of the first draper support 608 and the second draper support 612. Furthermore, the cutter bar mount's 606 cutter arms 630 extend forwardly from in between the upper portion 204A and bottom portion 206A of the draper belt 202A towards the cutter bar 106 for supporting therewith. Thus, the cutter bar 106 can be positioned significantly closer to the draper belt 202A compared to traditional cutter bar mounts.

It is appreciated that the draper belt 202A can circumscribe any number of cutter bar support assemblies 300A, 300B, 300C, 300D, 310A, 310B including one, two three, four, five, six, seven, eight, nine, ten or more than ten. In an exemplary embodiment, the cutter bar support assemblies 300A, 300B, 300C, 300D, 310A, 310B are spaced about 30 inches apart from each other with respect to the support members 602, 412, 526. However, it is appreciated that the distance between each support member 602, 412, 526 can be e.g., about 5 inches, 10 inches, 15 inches, 20 inches, 25 inches, 30 inches, 35 inches, 40 inches, 45 inches, 50 inches, 60 inches or more than 60 inches.

In other words, the draper belt 202A circumscribes the support member 602. Further, the cutter bar support sub-assembly 300A supports the draper belt 202A which circumscribes the support member 602. The support member 602 extends across a width (W) of the draper belt 202A and the draper belt 202A circumscribes the support member 602. Additionally, the cutter bar support sub-assembly 300A further includes a first draper support 608 supporting the draper belt 202A. The first draper support 608 is connected to a cutter bar mount 606 pivotably connected to the support member 602. Furthermore, the cutter bar support sub-assembly 300A includes a second draper support 612 supporting the draper belt 202A and spaced from and below the first draper support 608. The second draper support 612 is connected to a cutter bar mount 606 pivotably connected to the support member 602.

As shown in FIG. 7, an exemplary embodiment of the subject disclosure operates by allowing the draper belt sub-assembly 200A to pivot and flex with the cutter bar 106 as the harvester 100 moves across a crop field. That is, as the harvester 100 moves forward, the cutter bar 106 flexes to accommodate changes in terrain to more efficiently cut crop.

As the cutter bar 106 flexes, the rigid connection between the cutter bar 106 and the cutter arm 630 causes the support member 602 to pivot up and/or down about the elongated bar 218, and further causes the draper belt sub-assembly 200A to flex appropriately. To accommodate the flexing and to maintain a fluid draper belt 202A surface, the cutter bar mount 606 and the draper supports 608, 612 pivot about the pin 626. In other words, when a portion of the cutter bar 106 dips downward to accommodate a change in terrain while the remainder of the cutter bar 106 remains leveled, the same portion of the draper belt 202A flexes downward while the remainder of the draper belt 202A remains leveled.

In other words, the cutter bar mount 606 and the first draper support 608 pivot about the pin 626. Additionally, the second draper support 612 pivots with the cutter bar mount 606. Further, the frame mounting sub-assembly 604 allows the draper belt sub-assembly 200A to have up and down motion relative to the header frame 104 by pivoting about the pivot guide 648, which can be assisted via an actuator attached to the elongated member 650. Additionally, the tensioning mechanism 500A maintains tension in the draper belt 202A by moving the second roller 502 closer to, or further from, the second end cutter bar support sub-assembly 310B via the biasing member 514, the chain 516 and the cog 518. Finally, the motor 404 provides rotational motion to the rollers 402, 502 and the draper belt 202A to facilitate feeding cut crops to the feederhouse 108.

The advantages of having a draper belt assembly that can move and flex with the cutter bar are apparent. Specifically, connecting the draper belt assembly directly to the cutter bar allows the header to be constructed having a significant reduction in distance between the cutter bar and the draper belt, i.e., having the cutter bar positioned close to or adjacent the draper belt. Additionally, allowing the draper belt to track the motion of the cutter bar increases efficiency in collecting crops since less crop will be lost due to failing to reach the draper belt after being cut.

While the subject disclosure has been described with reference to exemplary embodiments, it will be appreciated by those skilled in the art that various changes may be made and equivalents may be substituted for elements thereof without departing from the scope of the exemplary embodiments. For example, features described in one embodiment may be incorporated into a different embodiment, such as the shape of the draper supports. Additionally, features described in one manner may instead be accomplished by known techniques in the art, such as means of making a pivotable connection.

In addition, modifications may be made to adapt a particular situation or material to the teachings of the various embodiments without departing from the essential scope thereof. For example, the header can include one or more cutter bar support assemblies acting in tandem with one another, each identical or different from each other, to support the cutter bar, as well as one or more draper belt assemblies attached to the header. It is to be understood, therefore, that the exemplary embodiments not be limited to the particular aspects disclosed, but it is intended to cover modifications within the spirit and scope of the exemplary embodiments as defined by the appended claims.

We claim:

1. A draper support sub-assembly for a draper belt assembly of a header of an agricultural harvester, the draper support subassembly comprising:
    a first draper support having an upwardly curved surface supporting an upper run of a draper belt;

a second draper support having an upwardly curved surface supporting a lower run of the draper belt; and a cutter bar mount for supporting a cutter bar, wherein the cutter bar mount is positioned adjacent to the first and second draper supports.

2. The draper support sub-assembly of claim 1, wherein the second draper support is spaced from and below the first draper support.

3. The draper support sub-assembly of claim 1, wherein the first draper support is an elliptical shaped support member.

4. The draper support sub-assembly of claim 1, wherein the cutter bar mount comprises a cutter arm extending outwardly away from the first draper support for connecting to the cutter bar.

5. The draper support sub-assembly of claim 1, wherein the cutter bar mount comprises a draper arm extending below the first draper support for supporting the second draper support.

6. A cutter bar support sub-assembly for a draper belt assembly of a header of an agricultural harvester, the cutter bar support sub-assembly comprising:
  a draper support sub-assembly having:
    a first draper support having a curved surface for supporting a draper belt, and
    a cutter bar mount for supporting a cutter bar, wherein the cutter bar mount is connected to the first draper support; and
  a support arm sub-assembly having:
    a support member for connecting to the header;
  wherein the draper support sub-assembly is pivotably connected to the support arm sub-assembly and pivotable about a longitudinal axis of the support arm sub-assembly.

7. The cutter bar support sub-assembly of claim 6, wherein the draper support sub-assembly comprises a second draper support having a curved surface for supporting the draper belt, and wherein the second draper support is connected to the cutter bar mount.

8. The cutter bar support sub-assembly of claim 6, wherein the draper support sub-assembly comprises a second draper support having a curved surface for supporting the draper belt, and wherein the second draper support is spaced from and below the first draper support.

9. The cutter bar support sub-assembly of claim 6, wherein the cutter bar mount comprises a draper arm extending below the first draper support for supporting a second draper support having a curved surface for supporting the draper belt.

10. The cutter bar support sub-assembly of claim 6, wherein the cutter bar mount comprises a cutter arm extending outwardly away from the first draper support for connecting to the cutter bar.

11. The cutter bar support sub-assembly of claim 6, wherein the support arm sub-assembly is pivotable about an axis substantially perpendicular to the longitudinal axis of the support arm sub-assembly in a direction upwards or downwards relative to the frame.

12. A header for an agricultural harvester, the header comprising:
  a frame;
  a cutter bar;
  a draper belt; and
  a cutter bar support sub-assembly connected to the frame, the cutter bar support sub-assembly comprising:
    a draper support sub-assembly having:
      a first draper support that includes a curved surface engaging the draper belt, and
      a cutter bar mount supporting the cutter bar, and
    a support arm sub-assembly comprising:
      a support member connected to the frame,
    wherein the draper support sub-assembly is pivotably connected to the support arm sub-assembly and pivotable about a longitudinal axis of the support arm sub-assembly.

13. The header of claim 12, wherein the cutter bar support sub-assembly is positioned above the draper belt.

14. The header of claim 12, wherein the support member extends across a width of the draper belt and the draper belt circumscribes the support member.

15. The header of claim 12, wherein the draper support sub-assembly further comprises a second draper support having a curved surface engaging the draper belt and spaced from and below the first draper support.

16. The header of claim 12, wherein the draper support sub-assembly further comprises a second draper support having a curved surface engaging the draper belt, and wherein the first draper support supports an upper run of the draper belt and the second draper support supports a bottom run of the draper belt.

17. The header of claim 12, wherein the draper support sub-assembly further comprises a second draper support having a curved surface engaging the draper belt, and wherein a bottom run of the draper belt extends between the first draper support and the second draper support.

18. The header of claim 12, wherein the cutter bar mount comprises a draper arm extending outwardly and below a bottom run of the draper belt for supporting a second draper support.

19. The header of claim 12, wherein the support arm sub-assembly is pivotally connected to the frame and configured to pivot about an axis substantially perpendicular to the longitudinal axis of the support arm sub-assembly.

20. The header of claim 12, wherein the draper support sub-assembly further comprises a second draper support having a curved surface engaging the draper belt, and wherein the cutter bar mount is connected to both the first and second draper supports.

* * * * *